(12) United States Patent
Ikeda

(10) Patent No.: US 12,014,563 B2
(45) Date of Patent: Jun. 18, 2024

(54) INFORMATION PROCESSING APPARATUS, CONTROL METHOD, AND NON-TRANSITORY STORAGE MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 435 days.

(21) Appl. No.: 17/294,788

(22) PCT Filed: Nov. 21, 2018

(86) PCT No.: PCT/JP2018/043003
§ 371 (c)(1),
(2) Date: May 18, 2021

(87) PCT Pub. No.: WO2020/105146
PCT Pub. Date: May 28, 2020

(65) Prior Publication Data
US 2022/0012477 A1  Jan. 13, 2022

(51) Int. Cl.
*G06V 40/10* (2022.01)
*G06V 30/194* (2022.01)

(52) U.S. Cl.
CPC ............ *G06V 40/10* (2022.01); *G06V 30/194* (2022.01)

(58) Field of Classification Search
CPC .... G06V 40/10; G06V 30/194; G06V 10/255; G06V 10/62; G06V 10/82; G06V 20/53;
(Continued)

(56) References Cited

U.S. PATENT DOCUMENTS 9,208,386 B1 * 12/2015 Kobold ................. G06V 20/53
9,881,217 B2 * 1/2018 Wang .................... G06V 20/53
(Continued)

FOREIGN PATENT DOCUMENTS

GB       2505501 A * 3/2014 ......... G06K 9/00624
JP    2007265290 A    10/2007
(Continued)

OTHER PUBLICATIONS

International Search Report of PCT Application No. PCT/JP2018/043003 dated Feb. 19, 2019.
(Continued)

*Primary Examiner* — Jose L Couso

(57) ABSTRACT

An information processing apparatus (2000) includes a recognizer (2020). An image (10) is input to the recognizer (2020). The recognizer (2020) outputs, for a crowd included in the input image (10), a label (30) describing a type of the crowd and structure information (40) describing a structure of the crowd. The structure information (40) indicates a location and a direction of an object included in the crowd. The information processing apparatus (2000) acquires training data (50) which includes a training image (52), a training label (54), and training structure information (56). The information processing apparatus (2000) performs training of the recognizer (2020) using the label (30) and the structure information (40), which are acquired by inputting the training image (52) with respect to the recognizer (2020, and the training label (54) and the training structure information (56).

20 Claims, 11 Drawing Sheets

(58) Field of Classification Search
CPC .... G06V 10/764; G06V 10/457; G06V 20/40; G06V 10/454; G06V 10/54; G06V 10/774; G06V 30/18057; G06T 7/00; G06T 7/20; G06T 1/00; G06T 2207/10016; G06T 2207/30196; G06T 7/70; G06T 2207/30232; G06T 2207/30242; G06T 7/80; G06T 7/97; G06T 3/4046; G06T 9/002; G06T 2207/20076; G06T 2207/20081; G06T 2207/20084; G06F 18/23; G06F 18/24; G06F 18/2155; G06F 18/2413; G06F 16/29; G06F 16/9537; H04N 7/18; G06N 3/02; G06N 3/08–088; G06N 3/0445; G06N 3/0454; G06N 3/4046; G06N 7/00; G06N 20/00; G06K 7/1482; Y10S 128/925

See application file for complete search history.

(56) References Cited

U.S. PATENT DOCUMENTS

| | | | | |
|---|---|---|---|---|
| 10,789,484 | B2* | 9/2020 | Ikeda | G06T 7/246 |
| 10,885,350 | B2* | 1/2021 | Ikeda | G06F 18/23 |
| 10,891,493 | B2* | 1/2021 | Ikeda | G06T 7/60 |
| 11,727,578 | B2* | 8/2023 | Ikeda | G06V 20/53 |
| 2007/0031005 | A1* | 2/2007 | Paragios | G06V 10/56 |
| | | | | 382/103 |
| 2009/0222388 | A1* | 9/2009 | Hua | G06N 5/02 |
| | | | | 382/103 |
| 2010/0322516 | A1 | 12/2010 | Xu et al. | |
| 2015/0178571 | A1 | 6/2015 | Zhang et al. | |
| 2016/0132755 | A1 | 5/2016 | Ikeda | |
| 2016/0133025 | A1 | 5/2016 | Wang et al. | |
| 2017/0053169 | A1* | 2/2017 | Cuban | G05D 1/104 |
| 2018/0253629 | A1 | 9/2018 | Bamba | |
| 2019/0102629 | A1 | 4/2019 | Ikeda | |
| 2019/0130580 | A1* | 5/2019 | Chen | G06V 10/82 |
| 2019/0205659 | A1* | 7/2019 | Cuban | G06V 20/41 |
| 2019/0333241 | A1 | 10/2019 | Yano et al. | |
| 2020/0098112 | A1 | 3/2020 | Tao et al. | |
| 2020/0202139 | A1 | 6/2020 | Ikeda | |

FOREIGN PATENT DOCUMENTS

| | | | |
|---|---|---|---|
| JP | 2017068598 A | * | 4/2017 |
| JP | 2018116692 A | | 7/2018 |
| WO | 2014207991 A1 | | 12/2014 |
| WO | 2017154655 A1 | | 9/2017 |
| WO | 2018216648 A1 | | 11/2018 |

OTHER PUBLICATIONS

US Office Action for U.S. Appl. No. 18/232,215, mailed on Apr. 16, 2024.

* cited by examiner

OUTLINE OF INFORMATION PROCESSING APPARATUS 2000

OPERATION IN CASE OF TRAINING

| LABEL DESCRIBING TYPE OF CROWD STRUCTURE | QUEUE STRUCTURE | ENCLOSURE STRUCTURE | AVOIDANCE STRUCTURE | PANIC STRUCTURE | CONFLUENCE STRUCTURE |
|---|---|---|---|---|---|
| IMAGE DESCRIBING CROWD STRUCTURE |  |  |  |  |  |
| LOCATION OF HUMAN INCLUDED IN CROWD STRUCTURE (EXAMPLE: LOCATION OF HEAD) |  |  |  |  |  |
| DIRECTION OF HUMAN INCLUDED IN CROWD STRUCTURE (EXAMPLE: DIRECTION OF HEAD) |  |  |  |  |  |

INFORMATION PROCESSING APPARATUS, CONTROL METHOD, AND NON-TRANSITORY STORAGE MEDIUM

This application is a National Stage Entry of PCT/JP2018/043003 filed on Nov. 21, 2018, the contents of all of which are incorporated herein by reference, in their entirety.

TECHNICAL FIELD

The present invention relates to a technology for acquiring information relevant to a crowd from a captured image.

BACKGROUND ART

Systems are developed which analyze a captured image and acquires information relevant to a crowd included in the captured image. For example, in a technology disclosed in Patent Document 1, a human region is extracted using a difference (background difference method) between an input image and a background image, and the human region included in a queue region is acquired using the queue region which assumes a predefined queue. In a case where the human region is larger than a predefined aspect ratio which assumes a human, the predefined queue region is recognized as a queue in which a plurality of humans are overlapped, and the number of humans in the queue region is assumed based on a size of the aspect ratio of the human region included in the queue region.

[Patent Document 1] Japanese Patent Application Publication No. 2007-265290
[Patent Document 2] PCT Publication No. 2014/207991

SUMMARY OF INVENTION

Technical Problem

The present inventor create a new technology for accurately recognizing a type of a crowd, not limited to queue, included in an image. An object of the present invention is to provide the technology for accurately recognizing the type of the crowd included in the image.

Solution to Problem

According to the present invention, there is provided an information processing apparatus including: 1) a recognizer that outputs a label describing a type of a crowd included in an image and structure information describing a structure of the crowd according to input of the image; 2) an acquisition unit that acquires training data. The training data includes the image, the label and the structure information which are output according to the input of the image to the recognizer. The information processing apparatus includes 3) a training unit that inputs the image included in the training data to the recognizer, and that performs training of the recognizer using the label and the structure information, which are output from the recognizer, and the label and the structure information which are included in the training data. The structure information includes a location and a direction of an object included in the image.

A control method according to the present invention is performed by a computer. The computer includes a recognizer that outputs a label describing a type of a crowd included in an image and structure information describing a structure of the crowd according to input of the image. The control method includes acquiring training data. The training data includes the image, the label and the structure information which are output according to the input of the image to the recognizer. The control method includes inputting the image included in the training data to the recognizer, and that performs training of the recognizer using the label and the structure information, which are output from the recognizer, and the label and the structure information which are included in the training data. The structure information includes a location and a direction of an object included in the image.

A program according to the present invention causes a computer to perform respective steps of the control method according to the present invention.

Advantageous Effects of Invention

According to the present invention, there is provided a technology for accurately recognizing a type of a crowd included in an image at high accuracy.

BRIEF DESCRIPTION OF DRAWINGS

The above-described object, the other objects, features, and advantages will be apparent by preferable example embodiments, which will be described below, and drawings accompanying with the example embodiments.

DESCRIPTION OF EMBODIMENTS

Hereinafter, example embodiments of the present invention will be described with reference to the accompanying drawings. Also, the same reference symbols are attached to the same components throughout the drawings and the description thereof will not be repeated. In addition, excluding a case of being especially described, each block indicates a functional unit configuration instead of a hardware unit configuration in each block diagram.

First Example Embodiment

Overview

Figure 1:
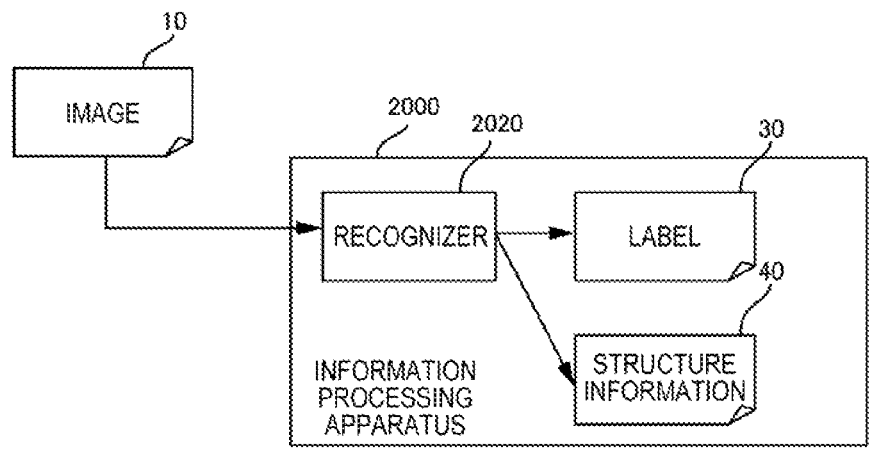
FIG. 1 is a diagram conceptually illustrating a process performed by an information processing apparatus according to an example embodiment.
Figure 1:
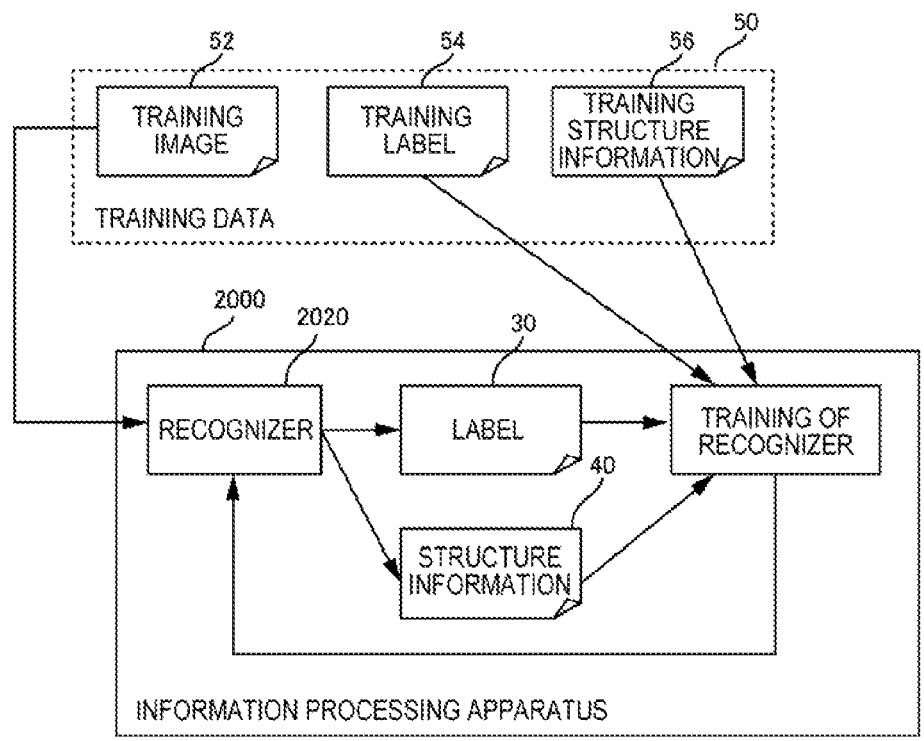

FIG. 1 is a diagram conceptually illustrating a process performed by an information processing apparatus 2000 according to an example embodiment. The information processing apparatus 2000 includes a recognizer 2020. An image 10 is input to the recognizer 2020. The recognizer 2020 extracts a label 30 and structure information 40. A crowd includes a plurality of objects. The object may be a human, an animal other than human, or a thing other than animal (for example, a vehicle such as a car, a bicycle, or a motorcycle). The label 30 indicates a type of the crowd included in the image 10. The type of the crowd includes, for example, a queue structure, an enclosure structure, a panic structure, a discrete structure, a confluence (gathering) structure, a congestion (stay) structure, an avoidance structure, a reverse movement structure, a traversal structure, a fight structure, and the like. The structure information 40 is information describing a structure of the crowd, and indicates at least a location and a direction of objects included in the crowd. Note that, in a case where a plurality of crowds are included in the image 10, the recognizer 2020 outputs the label 30 and the structure information 40 for each of the plurality of crowds.

Figure 2:
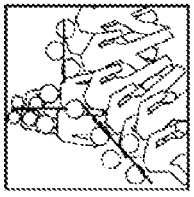
FIG. 2 is a diagram illustrating, in association with a type of crowd, the image including the crowd of the associated type, and a location and a direction of the humans constituting that crowd.
Figure 2:
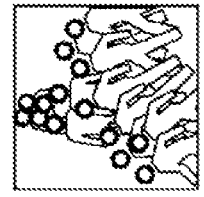
Figure 2:
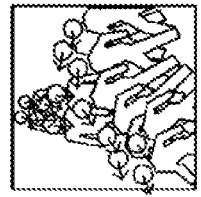
Figure 2:
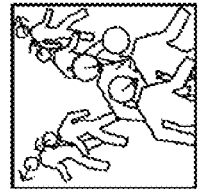
Figure 2:
Figure 2:
Figure 2:
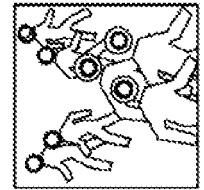
Figure 2:
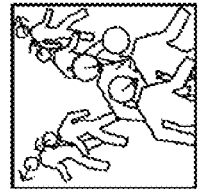
Figure 2:
Figure 2:
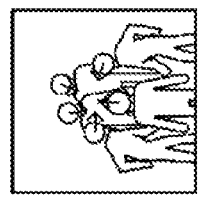
Figure 2:
Figure 2:
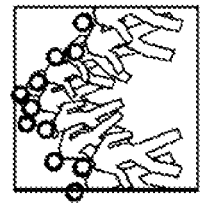
Figure 2:
Figure 2:
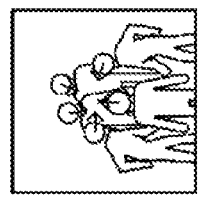
Figure 2:
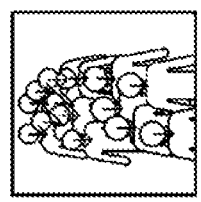

FIG. 2 is a diagram illustrating, in association with a type of crowd, the image including the crowd of the associated type, and a location and a direction of the humans constituting that crowd. In this example, the object is a human. In addition, a location of a head of the human is handled as the location of the object and a direction of a face of the human is handled as the direction of the object.

The information processing apparatus 2000 performs training of the recognizer 2020. To do so, the information processing apparatus 2000 acquires training data 50. The training data 50 includes a training image 52, a training label 54, and training structure information 56. The training image 52 is an image used for the training of the recognizer 2020. For example, an image including only one type of the crowd is used as the training image 52. The training label 54 indicates the type of the crowd included in the training image 52. In a case where the training image 52 is input to the recognizer 2020, the training label 54 indicates the label 30 which has to be output from the recognizer 2020. The training structure information 56 is information describing a structure of the crowd included in the training image 52. In a case where the training image 52 is input to the recognizer 2020, the training structure information 56 indicates the structure information 40 which has to be output from the recognizer 2020. That is, the training label 54 and the training structure information 56 are data (positive example data) describing a correct solution corresponding to the training image 52, in the domain of so-called supervised learning. Note that, in addition to the positive example data, negative example data may be further used for the training of the recognizer 2020. Here, the negative example data is the training data 50 including the training image 52 which does not include the crowd therein, and the training label 54 and the training structure information 56 which indicate that the crowd does not exist.

In a training phase, the information processing apparatus 2000 inputs the training image 52 into the recognizer 2020. This means that the training image 52 is handled as the image 10 in the training phase. The information processing apparatus 2000 acquires the label 30 and the structure information 40 from the recognizer 2020 in response to inputting the training image 52. The information processing apparatus 2000 performs the training of the recognizer 2020 using the label 30 and the structure information 40, which are acquired from the recognizer 2020, and the training label 54 and the training structure information 56.

Here, the recognizer 2020 is configured such that not only the recognizer recognizing the structure information 40 but also a recognizer recognizing the label 30 are trained through the training using errors between the structure information 40 acquired by inputting the training image 52 and the training structure information 56 corresponding to the training image 52. For example, as will be described later, the recognizer 2020 includes a neural network, and one or more nodes are shared between a network which recognizes the label 30 and a network which recognizes the structure information 40.

In an operation phase, the information processing apparatus 2000 inputs an analysis target image, which is an image to be analyzed, into the recognizer 2020. This means that the analysis target image is input as the image 10 in the operation phase. For example, the analysis target image is a video frame which constitutes a surveillance video generated by a surveillance camera. The information processing apparatus 2000 inputs the analysis target image into the recognizer 2020. For example, the recognizer 2020 outputs the label 30 and the structure information 40 for one or more crowds included in the analysis target image. However, it is enough for the structure information 40 to be output in the training phase in order to improve recognition accuracy of the label 30, and the structure information 40 is not necessarily output in the operation phase.

Advantageous Effect

The present inventor has found out a problem in which the accuracy of label recognition by the recognizer recognizing a type (label) of the crowd does not improve fast when the recognizer is trained using only correct labels. The cause of this problem is that the type of the crowd is determined by various elements (such as a location and a direction of each object, how each object overlaps with each other, and the like), and therefore training with images including a crowd and labels describing the type of the crowd is not sufficient to train the recognizer that recognizes such the complicated information. Note that, "the accuracy of label recognition does not improve fast" means that it is necessary to perform a long period of training using a large quantity of training data in order to improve the accuracy of label recognition accuracy well, and means that the accuracy of label recognition remains low with a limited, small quantity of training data.

At this point, as described above, the information processing apparatus 2000 according to the present example embodiment includes the recognizer 2020, which outputs the label 30 describing the type of the crowd included in the image 10 and the structure information 40 describing the location and the direction of the human included in the crowd included in the image 10, according to the input of the image 10. Further, the recognizer 2020 is formed such that not only a recognizer which recognizes the structure information 40 but also a recognizer which recognizes the label 30 are learned through training based on errors between the structure information 40, which is output by inputting the training image 52, and the training structure information 56 corresponding to the training image 52. That is, the training of the recognizer of the label 30 is performed using not only the label 30 but also the structure information 40. Accordingly, compared to a case of using only the label for training the recognizer of the label describing the type of the crowd, it is possible to further improve the accuracy of the recognizer of the label. In addition, it is possible to reduce time required for training of the recognizer of the label or the quantity of the training data.

Note that, the above-described description with reference to FIG. 1 is an example to facilitate understanding of the information processing apparatus 2000, and does not limit the function of the information processing apparatus 2000. Hereinafter, the information processing apparatus 2000 according to the present example embodiment will be described in further detail.

Example of Functional Configuration of Information Processing Apparatus 2000

Figure 3:
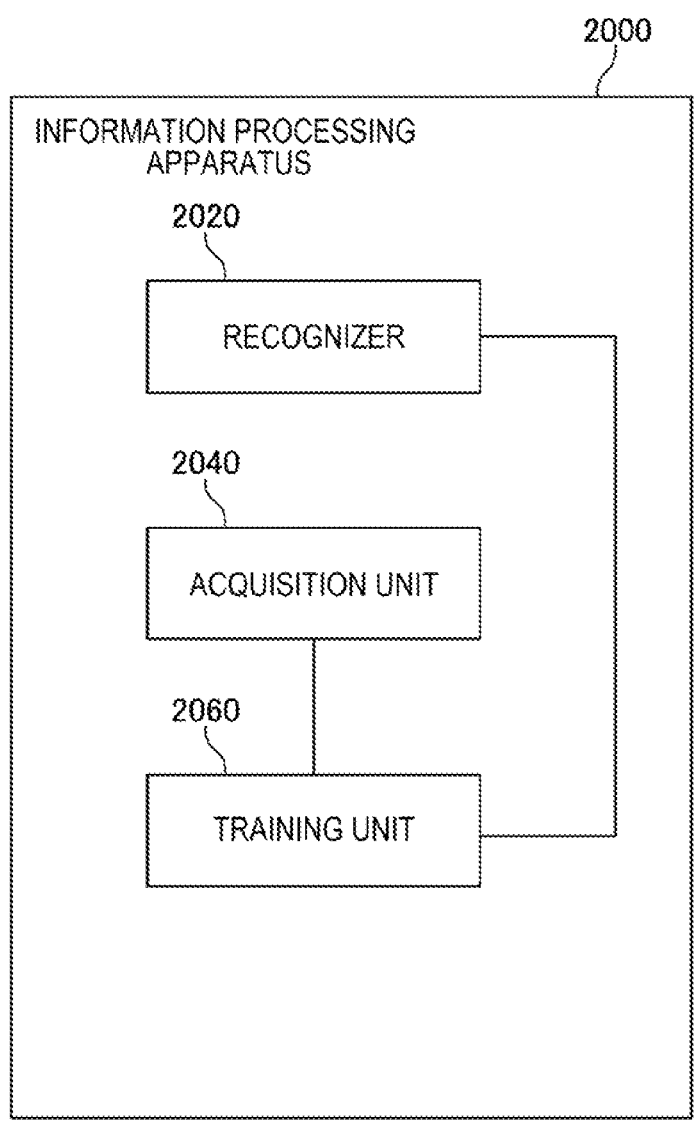
FIG. 3 is a diagram illustrating a functional configuration of an information processing apparatus of a first example embodiment.

FIG. 3 is a diagram illustrating a functional configuration of the information processing apparatus 2000 of the first example embodiment. The information processing apparatus 2000 includes the recognizer 2020, an acquisition unit 2040, and a training unit 2060. The recognizer 2020 outputs the label 30 describing the type of the crowd included in the image 10 according to the input of the image 10. The acquisition unit 2040 acquires the training data 50. The training data 50 includes the training image 52, the training label 54, and the training structure information 56. The training unit 2060 inputs the training image 52 to the recognizer 2020, and performs training of the recognizer 2020 using the label 30 and the structure information 40 that are output from the recognizer 2020, and the training label 54 and the training structure information 56.

Hardware Configuration of Information Processing Apparatus 2000

The respective functional configuration units of the information processing apparatus 2000 may be realized by hardware (for example: a hard-wired electronic circuit) which realizes the respective functional configuration units, or may be realized by a combination of the hardware and software (for example: a combination of the electronic circuit and a program which controls the electronic circuit, or the like). Hereinafter, a case where the respective functional configuration units of the information processing apparatus 2000 are realized through the combination of the hardware and the software will be further described.

Figure 4:
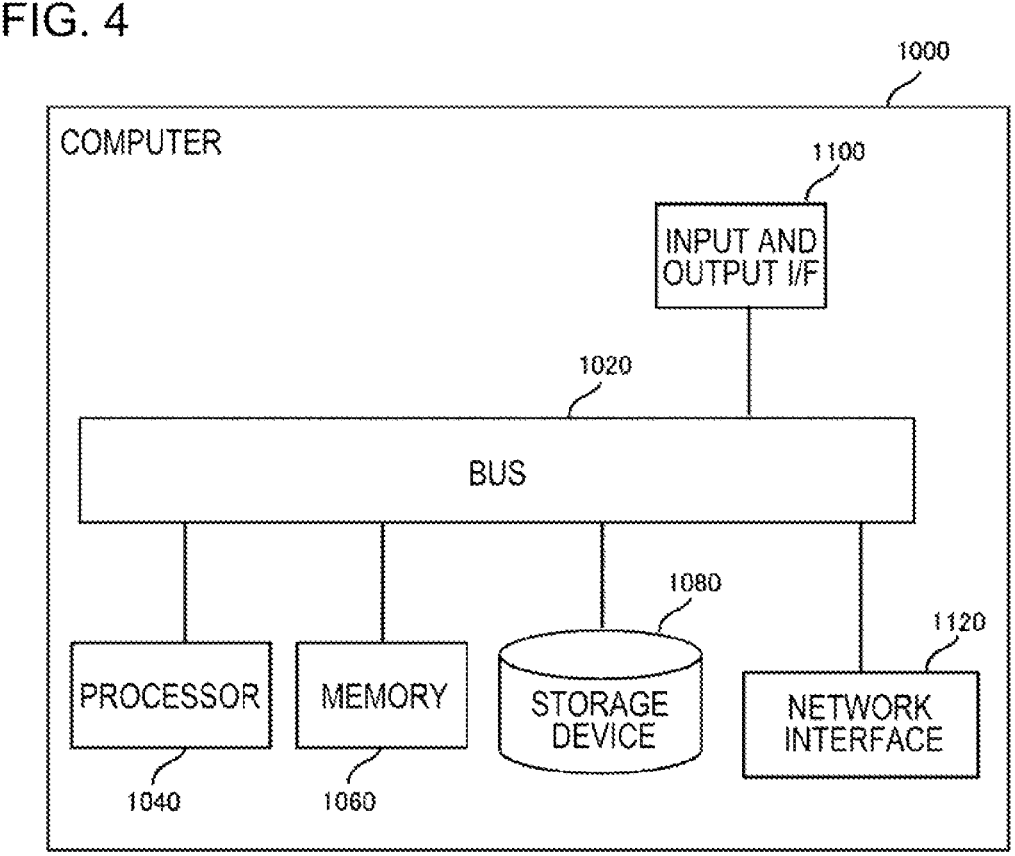
FIG. 4 is a diagram illustrating a computer for realizing the information processing apparatus.

FIG. 4 is a diagram illustrating a computer 1000 for realizing the information processing apparatus 2000. The computer 1000 is any computer. For example, the computer 1000 is a Personal Computer (PC), a server machine, or the like. The computer 1000 may be a dedicated computer designed to realize the information processing apparatus 2000, or may be a general-purpose computer.

The computer 1000 includes a bus 1020, a processor 1040, a memory 1060, a storage device 1080, an input and output interface 1100, and a network interface 1120. The bus 1020 is a data transmission path for transmitting and receiving data to and from each other by the processor 1040, the memory 1060, the storage device 1080, the input and output interface 1100, and the network interface 1120. However, a method for connecting the processor 1040 and the like to each other is not limited to bus connection.

The processor 1040 includes various processors such as a Central Processing Unit (CPU), a Graphics Processing Unit (GPU), and a Field-Programmable Gate Array (FPGA). The memory 1060 is a primary memory unit realized using a Random Access Memory (RAM), or the like. The storage device 1080 is a secondary memory unit realized using a hard disk, a Solid State Drive (SSD), a memory card, a Read Only Memory (ROM), or the like.

The input and output interface 1100 is an interface for connecting the computer 1000 to the input and output device. For example, an input device, such as a keyboard, and an output device, such as a display device, are connected to the input and output interface 1100. The network interface 1120 is an interface for connecting the computer 1000 to a communication network. The communication network is, for example, a Local Area Network (LAN) or a Wide Area Network (WAN). A method of the network interface 1120 connecting to the communication network may be wireless connection or a wired connection.

The storage device 1080 stores program modules which realize the respective functional configuration units of the information processing apparatus 2000. The processor 1040 realizes functions corresponding to the respective program modules by reading and executing the respective program modules in the memory 1060.

The storage device 1080 may further store the image 10. However, the image 10 is just required to be able to be acquired by the computer 1000, and not required to be stored in the storage device 1080. For example, it is possible to store the image 10 in a memory unit (Network Attached Storage (NAS) or the like) which is connected to the computer 1000 through the network interface 1120. The same method as in the image 10 is applied for the training data 50. Note that, the image 10 and the training data 50 may be stored in locations which are different from each other, or may be stored in the same location with each other.

Flow of Process

Figure 5:
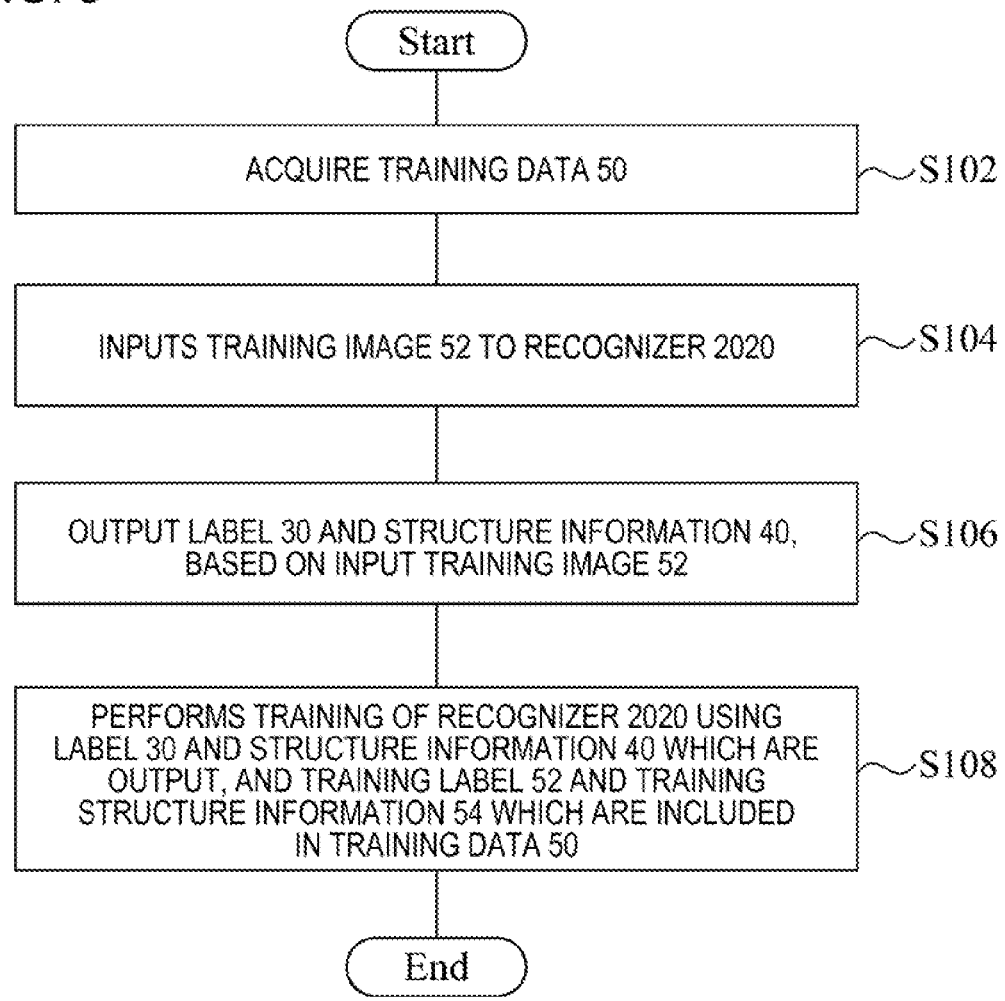
FIG. 5 is a flowchart illustrating a flow of a process performed by the information processing apparatus of the first example embodiment.

FIG. 5 is a flowchart illustrating a flow of a process performed by the information processing apparatus 2000 of the first example embodiment. The acquisition unit 2040 acquires the training data 50 (S102). The training unit 2060 inputs the training image 52 to the recognizer 2020 (S104). The recognizer 2020 outputs the label 30 and the structure information 40 based on the training image 52 that is input (S106). The training unit 2060 performs the training of the recognizer 2020 using the label 30 and the structure information 40 that are output from the recognizer 2020, and the training label 54 and the training structure information 56 that are included in the training data 50 (S108).

The process illustrated in FIG. 3 is repeated until the recognizer 2020 is sufficiently trained (until the accuracy of the recognizer 2020 becomes sufficiently high). For example, the recognizer is trained by computing loss describing errors between the label 30 and the training label 54 and loss describing errors between the structure information 40 and the training structure information 56, and the process of FIG. 3 is repeated until the loss is equal to or smaller than a predetermined threshold or the loss is minimized.

Structure Information 40

As described above, the structure information 40 corresponding to the image 10 is information that describes the structure of the crowd included in the image 10, and indicates at least the location and the direction of the object included in the crowd. Here, it is possible to use various methods as a method for indicating the location and the direction of the object included in the crowd as data. Hereinafter, the method will be illustrated in detail.

Method for Indicating Location

There may be various ways to define the location of the object based on an image region describing the object. For example, the location of the object is indicated by a predetermined location (a central location, a peak, or the like) of the image region describing the object. Here, the "image region describing the object" may be an image region that describes the whole object in the image or may be an image region that describes a part of the object. The "image region that describes the whole object" includes, for example, an image region enclosed by an outline of the object or a bounding rectangle of the outline of the object. The "image region that describes a part of the object" includes, for example, an image region enclosed by an outline of a predetermined part of the object or an image region that describes the bounding rectangle of the outline. It is possible to use a any part as the predetermined part. For example, in a case where the object is a human, it is possible to use a face, a head, a body, or the like as the predetermined part. In another example, in a case where the object is a vehicle, it is possible to use a hood, a front glass, a number plate, or the like as the predetermined part.

The above-described various locations are indicated by, for example, coordinates of pixels corresponding to the locations in the image 10. For example, a central location of the image region that describes the object is indicated by coordinates of pixels corresponding to the central location.

However, in order to facilitate the training using the training structure information 56, the location of the object may be indicated by a method other than the coordinates of pixels. For example, the image 10 is divided into a plurality of partial regions, and the location of the object is indicated using the partial regions. Hereinafter, a case where the partial regions are used will be described in further detail.

For example, the location of the object is determined by the above-described partial regions including the predetermined location of the image region describing the object. For example, a matrix (hereinafter, a location matrix) describing disposition of the partial regions is prepared. Then, the location of each object included in the image 10 is described by setting 1 to the element corresponding to the partial region in which the object is located, and setting 0 to the element corresponding to the partial region in which the object is not located. For example, in a case where N*M partial regions are acquired from the image 10 (both N and M are natural numbers), a location matrix including N rows and M columns is prepared. Further, in a case where the object is included in a partial region at an i-th row and a j-th column, the i-th row and the j-th column of the location matrix is set to 1. In contrast, in a case where the object is not included in the partial region at the i-th row and the j-th column, the i-th row and the j-th column of the location matrix is set to 0.

Figure 6:
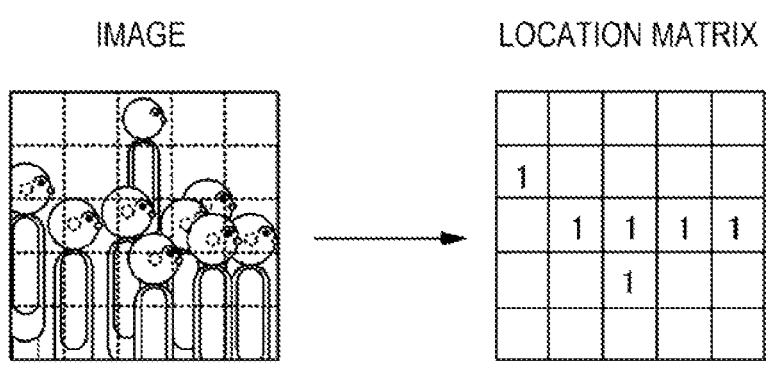
FIG. 6 is a first diagram illustrating a method for indicating a location of an object using partial regions.

FIG. 6 is a first diagram illustrating a method for indicating the location of the object using the partial regions. In a location matrix of FIG. 6, an element corresponding to a partial region in which a head of a human is located is set to 1, and an element corresponding to a partial region in which the head of the human is not located is set to 0.

Note that, in a case where a plurality of objects are included in certain partial regions, the structure information 40 may include information that describes the number of objects included in respective partial regions. For example, in a case where the above-described location matrix is used, each element of the location matrix indicates the number of objects included in the partial region corresponding to the element. However, the location matrix may indicate only whether or not an object is included in each partial region (that is, either one of 1 and 0) without taking the number of objects included in the partial region into consideration.

Figure 7:
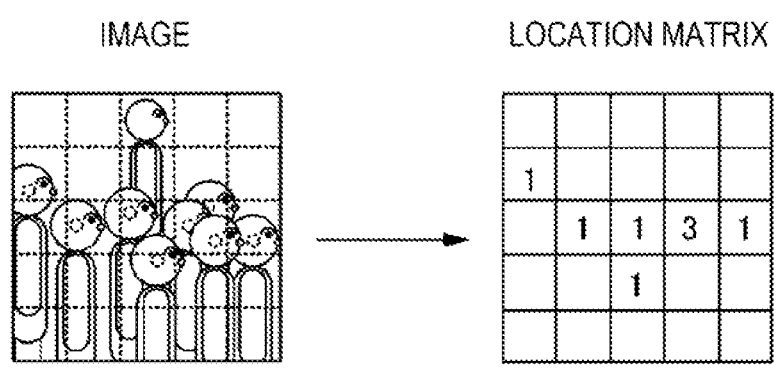
FIG. 7 is a second diagram illustrating the method for indicating the location of the object using the partial regions.

FIG. 7 is a second diagram illustrating the method for indicating the location of the object using the partial regions. In a location matrix of FIG. 7, the number of heads of humans included in a partial region is set to an element corresponding to each partial region.

In another example, the location of the object may be defined based on an overlap degree between the image region describing the object and the partial region. For example, in a case where the overlap degree between the image region describing the object and the partial region is equal to or larger than a predetermined value, it is handled that the object is located in the partial region. Here, the overlap degree between the image region describing the object and the partial region is computed as, for example, "Sa/Sb", while Sa represents an area of the image region of the object included in the partial region, and Sb represents an area of the partial region. For example, in the location matrix, a partial region in which Sa/Sb is equal to or larger than the threshold is set to 1 and a partial region in which Sa/Sb is smaller than the threshold is set to 0. In another example, instead of setting 1 or 0 to each element of the location matrix, the overlap degree (Sa/Sb) of the image region describing the object, which is computed for the partial region corresponding to the element, may be set. Here, the overlap degree may be described as an average luminance which is acquired by: performing binarization to the image 10 where pixels of the image region describing the object are set to a maximum value (for example, 255) and another pixel is set a minimum value (for example, 0); and then computing the average of luminance of each partial region.

Figure 8:
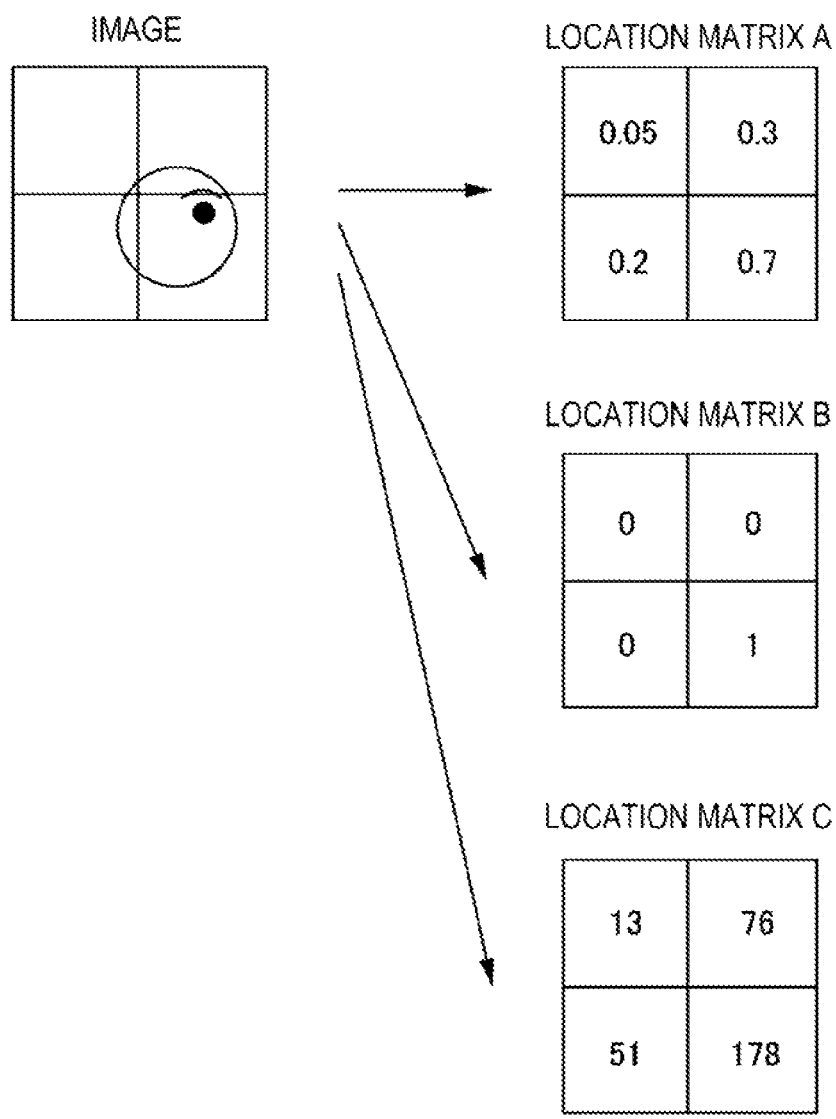
FIG. 8 is a third diagram illustrating the method for indicating the location of the object using the partial regions.

FIG. 8 is a third diagram illustrating the method for indicating the location of the object using the partial regions. For simple description, four partial regions are noted in FIG. 8. Each element of a location matrix A indicates a ratio of a head region of a human included in the partial region. Each element of a location matrix B indicates 1 in a case where the ratio of the head region of the human included in the partial region is equal to or larger than the threshold and, otherwise, indicates 0. Here, the threshold is set to 0.5. Thus, only an element corresponding to the bottom-right partial region is 1. A location matrix C is acquired by computing the average luminance for each partial region after performing the binarization to the image where the head region of the human is set to the maximum value (for example, 255) and the other regions are set to the minimum value (for example, 0).

Method for Indicating Direction

It is possible to define the direction of the object using various methods based on a part or the entirety of the image region describing the object. For example, the direction of the object is defined using a vector describing a direction defined from the entirety of the image region describing the object. In another example, the direction of the object is defined as the vector describing the direction of the predetermined part of the object. Here, the above-described vector describing the direction of the object is referred to as a direction vector. The direction vector is, for example, a unit vector of a length of 1.

A direction of the direction vector may be quantized using angles of previously specified intervals. For example, in a case where quantization at an interval of 45° is performed, the direction of the object is indicated by any one of eight directions.

The direction of the object may be indicated using the above-described partial regions. For example, a matrix (hereinafter, a direction matrix), which indicates information describing the direction of the object included in each partial region, is prepared. For each element of the direction matrix, for example, an average of the direction vectors acquired for the objects included in the corresponding partial region is computed and a direction of the computed average vector is set. That is, an average direction of the objects included in the partial regions is set as the information describing the direction of the objects, for each partial region.

In another example, in a case where the direction vector is quantized as described above, the number of direction vectors acquired for the object included in the partial region may be counted for each direction, and a direction whose count number is the largest may be set as the element of the direction matrix corresponding to the partial region. In addition, a histogram describing a count number of each direction may be set as the element of the direction matrix for each partial region.

Figure 9:
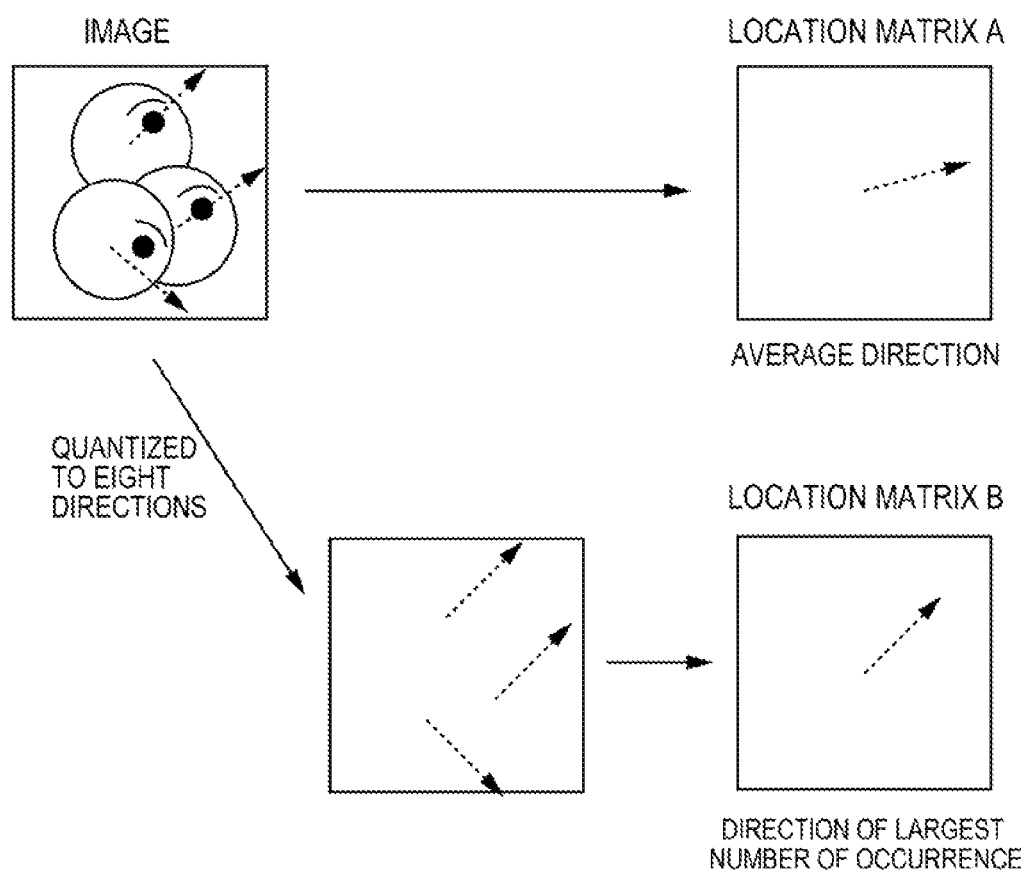
FIG. 9 is a diagram illustrating a method for indicating a direction of the object using the partial regions.

FIG. 9 is a diagram illustrating a method for indicating the direction of the object using the partial region. For simple description, one partial region is noted in FIG. 9. The partial region includes faces of three humans. An element of direction matrix A indicates an average of directions of the faces of the humans included in the partial region. Each element of the direction matrix B indicates a direction whose number of occurrence is the largest of directions of the faces of the humans included in the partial region. Here, before conversion into the direction matrix B is performed, each direction acquired from the image 10 is quantized to any of the eight directions. As a result, a direction of +45° is a direction with the largest number of occurrence.

Target Object

The structure information 40 may indicate the location and the direction for each of all the objects included in the corresponding image 10, or may indicate the location and the direction for some of the objects included in the relevant image 10. In a latter case, for example, the structure information 40 indicates the location and the direction of the object for only the objects constituting a crowd among the objects included in the corresponding image 10. For example, in a case where a queue is assumed as the type of the crowd, the image 10 includes objects included in the queue and objects not included in the queue. In this case, the structure information 40 indicates the location and the direction of only the object included in the queue, and does not indicate the location and the direction of the object not included in the queue. In addition, the structure information 40 may indicate the location and the direction of only objects which satisfy predetermined criteria, such as being equal to or larger than a predetermined size. In a case where the location and the direction of only the object being equal to or larger than the predetermined size are indicated, the location and the direction of the object which has a smaller size is not included in the structure information 40.

Configuration of Recognizer 2020

The recognizer 2020 outputs the label 30 describing the type of the crowd included in the image 10 for the image 10 that is input. In addition, in at least the training phase, the recognizer 2020 further outputs the structure information 40. Here, as a model of the recognizer 2020, it is possible to use various models presented by general machine learning, such as a neural network (for example, a Convolutional Neural Network (CNN)).

Figure 10:
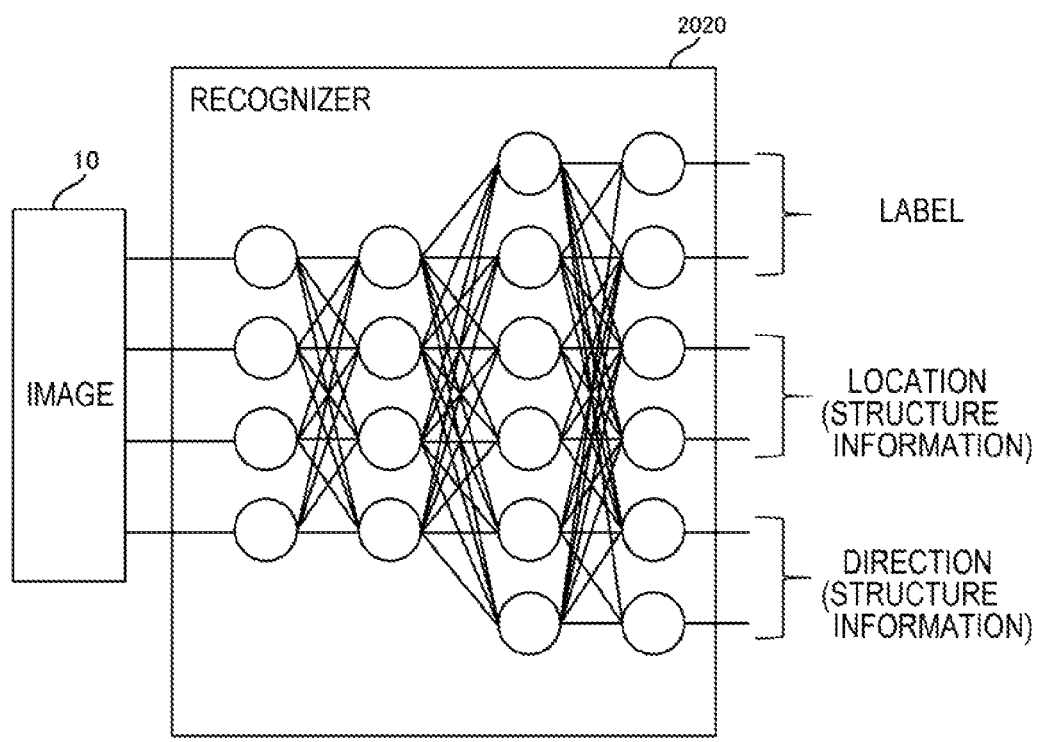
FIG. 10 is a diagram illustrating a recognizer included as a neural network.

FIG. 10 is a diagram illustrating the recognizer 2020 formed as the neural network. In FIG. 10, the recognizer 2020 includes a neural network to which the image 10 is input and which outputs the label describing the type of the crowd, the location of the object (structure information), and the direction of the object (structure information).

In the neural network of FIG. 10, nodes are shared between a network recognizing the label 30 and a network recognizing the structure information 40. Thus, the network recognizing the label 30 is trained based on not only errors between the label 30 output from the recognizer 2020 and the training label 54 but also errors between the structure information 40 output from the recognizer 2020 and the training structure information 56. Accordingly, as described above, it is possible to more easily improve the accuracy of the recognizer of the label 30, and it is possible to reduce time and the quantity of the training data, which are required for the training of the recognizer of the label 30.

Note that, in the neural network of FIG. 10, the entirety of the nodes are shared between the network recognizing the label 30 and the network recognizing the structure information 40. However, the networks are just required to share one or more nodes, and are not required to share all nodes.

Figure 11:
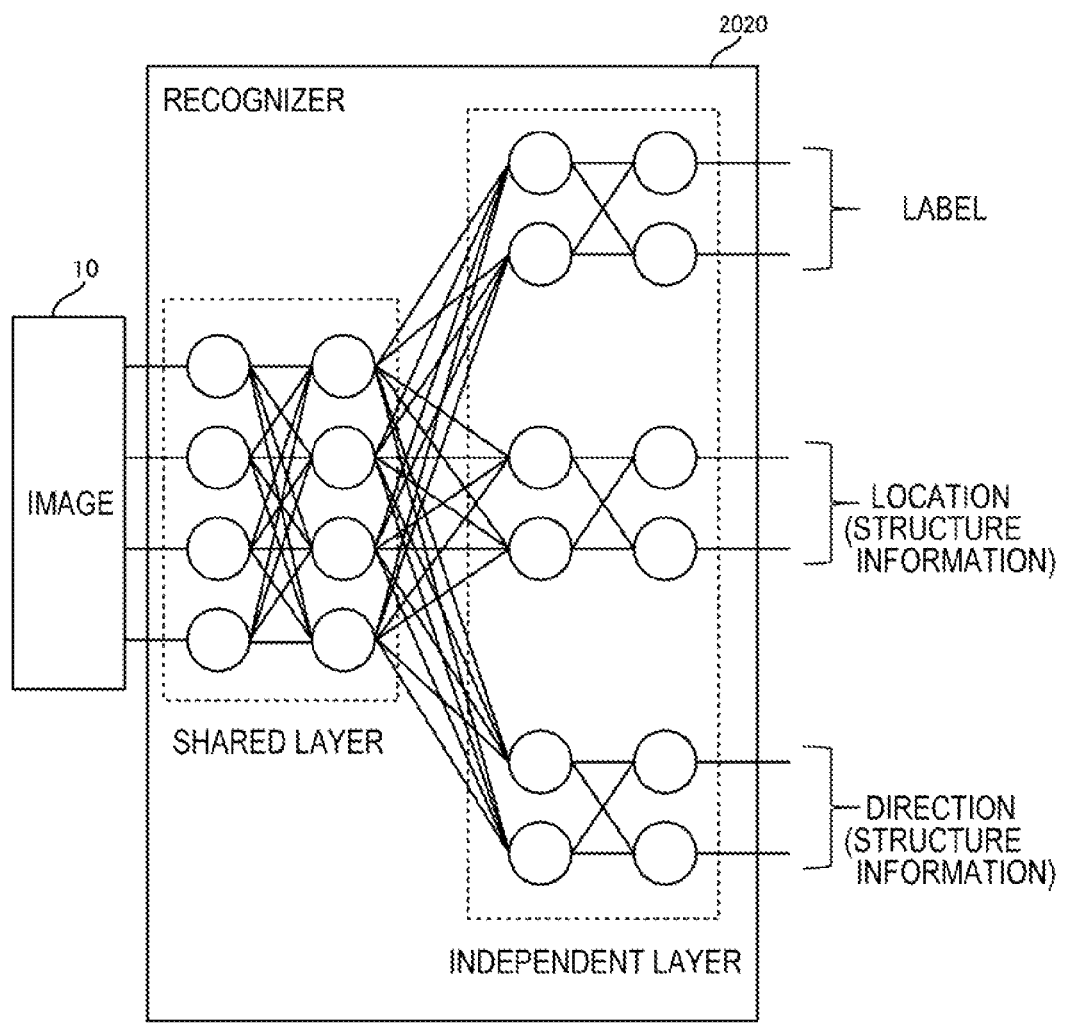
FIG. 11 is a diagram illustrating an example of a case where some layers are shared in a plurality of neural networks included in the recognizer.

FIG. 11 is a diagram illustrating an example of a case where only some nodes are shared between the network recognizing the label 30 and the network recognizing the structure information 40. In FIG. 11, upper layers are shared between the network recognizing the label 30 and the network recognizing the structure information 40, while lower layers are independent from each other. As above, the lower networks are independent from each other between the network recognizing the label 30 and the network recognizing the structure information 40. Therefore, for example, in a case where it is not necessary to acquire the structure information 40 in the operation phase, it is possible to shorten the time required for recognition process by not operating a part of the network recognizing the structure information 40 that are independent from the network recognizing the label 30.

Here, as described above, it is possible to use various models shown in the general machine learning as the model of the recognizer 2020, and the model is not limited to the neural network. As an example of another model of the machine learning, a multi-class logistic regression may be provided.

In a case where the multi-class logistic regression is used for the model of the recognizer 2020, for example, the recognizer 2020 outputs data (class identifier) describing a combination of the label 30 describing the type of the crowd included in the image 10 and the structure information 40 (the location and the direction) in response to the input of the image 10. Suppose that any one of 8 class identifiers from 0 to 7 is output by the multi-class logistic regression, and the respective class identifiers have meanings as follows: "0:

queue+location A1+direction B1", "1: queue, location A1, direction B2", "2: queue+location A2+direction B1", "3: queue, location A2+direction B2", "4: stay+location A1+direction B1", "5: stay, location A1, direction B2", "6: stay+location A2+direction B1", and "7: stay, location A2+direction B2". In a case where the recognizer 2020 is trained to output (recognize) the class in response to the input of the image 10, it is possible to improve the label recognition accuracy by the training using the training structure information 56, similar to the example of the above-described neural network.

Here, specifically, in the operation phase, a larger-sized image 10 which includes a plurality of crowds may be input with respect to the recognizer 2020. Here, in a case where the recognizer 2020 performs, for example, a process of extracting and recognizing an image of a rectangular region from each of a plurality of rectangular regions disposed in the input image, the recognizer 2020 recognizes the type of the crowd (label 30) corresponding to the rectangular region from the image of the rectangular region, and recognizes the location and the direction of (structure information 40) of the object included in the crowd. The type of the crowd and the location and the direction of the object are output for each rectangular region. For example, in a case where the recognizer 2020 is formed using the neural network illustrated in the above-described in FIG. 10, the image of each rectangular region is input to the neural network.

Here, various methods are used as a method for defining a rectangular region to be processed. For example, a plurality of rectangles having a predetermined size are extracted from an image using a sliding window, and the extracted rectangular region is handled as a target for process.

In another example, information describing a location on the image, a shape of the rectangular region, and a size of the rectangular region may be previously stored in a storage device for each rectangular region to be processed. Note that, the size of the rectangular region may be defined by an absolute value independent from a size of the image, or may be defined by a relative value with respect to the size of the image.

In a case where the rectangular region is defined for each location on the image, the number of rectangular regions associated with one location may be one or plural. In a latter case, for example, a plurality of types of rectangular regions which have different combinations of the shape and the size are associated with one location.

It is preferable to define the size of the rectangular region based on a size of an object region in a case of the training and a size of the image in the case of the training. Specifically, the size of the rectangular region is set as the size of the image at the training in a case where the size of the object region at the training is adjusted to the size of the object region corresponding to a location of the rectangular region. Here, it is conceivable that the size of the object included in the image is different according to the location on the image (according to a locational relationship with a camera). Here, in a case where the size of the rectangular region is defined based on a size of the object region detected from the image, it is preferable to cause the size of each rectangular region to be different according to the location thereof. The same method is applied for the shape of the rectangular region.

The location, the shape, and the size of the rectangular region may be manually set by the user. In another example, the location, the shape, and the size of the rectangular region may be automatically computed and set using, for example, a camera parameter describing a location or a pose of a camera in the rectangular region, an actual size of a recognition target, a relationship of a size of the recognition target corresponding to the size of the input image in the case of the training.

Acquisition of Training Data 50: S102

The acquisition unit 2040 acquires the training data 50. The acquisition unit 2040 acquires the training data 50 using any method. For example, the recognizer 2020 acquires the training data 50 from a storage device which stores the training data 50. The storage device which stores the training data 50 may be provided in an inside or an outside of the information processing apparatus 2000. In another example, the acquisition unit 2040 acquires the training data 50 by receiving the training data 50 transmitted by another apparatus.

Here, since the training data 50 is data for the training, the training data 50 is previously generated before the training. Hereinafter, a method for generating the training data 50 will be described.

For example, it is possible to automatically generate the training data 50 using a training data generation apparatus disclosed in Patent Document 2. It is possible for the training data generation apparatus disclosed in Patent Document 2 to automatically generate a lot of images that include a plurality of objects constituting a crowd state and a label describing the state thereof, through a simulation using synthesis of an object image and a background image or a simulation using CG. In a case where the training data generation apparatus disclosed in Patent Document 2 is used, it is possible to acquire the training image 52 including the crowd and the training label 54 describing the type of the crowd included in the training image 52 in quantity.

Note that, the training image 52 may be an image acquired by processing the image instead of the image prepared using the above-described simulation. Specifically, the training image 52 may be an image which is acquired by performing trim, tone correction, or the like on the image acquired through the simulation, a luminance image which is acquired from the image acquired through the simulation, a normalized image which is acquired by normalizing the luminance image using an average and dispersion of luminance in the image, a luminance gradient image acquired by computing a gradient of luminance, or the like.

Further, in the training data generation apparatus disclose in Patent Document 2, the simulation is performed by controlling the location of the object or the direction of the object. Thus, in a case where control information is used, it is possible to automatically generate information describing the location and the direction of the object included in the crowd included in the training image 52, that is, the training structure information 56 in quantity. Accordingly, in a case where the training data generation apparatus disclosed in Patent Document 2 is used, it is possible to automatically acquire the training data 50 in quantity.

As above, in a case where the training data 50 is automatically generated using the training data generation apparatus disclosed in Patent Document 2, it is possible to reduce labor to manually generate the training data 50. In addition, even in a situation in which it is difficult to manually generate the training data 50, it is possible to easily acquire the training data 50.

However, a part or an entirety of the training data 50 may be manually generated. For example, it is possible to generate the training image 52 by imaging the crowd using any camera. However, the training image 52 may not be the image generated by the camera as it is and may be an image which is acquired by processing the image generated by the camera. The process performed on the image generated by the camera is the same as the above-described process which may be performed on the image generated by the simulation.

It is possible to generate the training label 54 in such a way that, for example, a user determines the type of the crowd included in the training image 52 generated as described above by his/her eyes, and manually specifies the type of the crowd.

Similarly, it is possible to generate the training structure information 56 in such a way that a user determines the location and the direction of the object included in the training image 52 by his/her eyes, and manually specifies the location and the direction of each object. However, in a case where the training structure information 56 indicates the location and the direction of the object for the plurality of partial regions included in the training image 52, the training structure information 56 may be generated in such a way that the user manually specifies the location and the direction of the object, and the computer converts the specified location and the direction into the location and the direction for the above-described partial region.

Training of Recognizer 2020: S106

The training unit 2060 performs training of the recognizer 2020. Specifically, the training unit 2060 acquires the label 30 and the structure information 40 with respect to the training image 52 by inputting the training image 52 to the recognizer 2020. Further, the training unit 2060 performs the training (parameter updating) of the recognizer 2020 using the label 30 and the structure information 40 which are acquired from the recognizer 2020, and using the training label 54 and the training structure information 56 which are included in the training data 50. For example, in a case where the recognizer 2020 includes the neural network, weight and bias of the neural network is updated.

Here, the training label 54 indicates the label 30 which is acquired when the training image 52 is input to the recognizer 2020. Thus, the training label 54 is considered to be data which indicates a correct solution for the label 30. Similarly, the training structure information 56 indicates the structure information 40 which is acquired when the training image 52 is input to the recognizer 2020. Thus, the training structure information 56 is considered to be data which indicates a correct solution for the structure information 40. Accordingly, the training unit 2060 performs the training of the recognizer 2020 based on comparison of the actual outputs that are acquired from the recognizer 2020 and the correct solutions that should be acquired from the recognizer 2020.

It is possible to use an existing technology as a technology for performing the training of the recognizer based on the comparison of the actual output that is acquired from the recognizer and the correct solution that should be output from the recognizer. For example, the training unit 2060 computes the loss describing an error based on the label 30, the structure information 40, the training label 54, and the training structure information 56, and updates parameters of the recognizer 2020 so as to reduce the computed loss. It is possible to use various technologies, such as a method for stochastic gradient descent, as a technology for updating the parameters of the recognizer so as to reduce the loss. Note that, a formula for computing the loss (loss function) may be set in advance in the training unit 2060, or may be stored in a storage device which is accessible from the training unit 2060.

Note that, the parameters of the recognizer 2020 are stored in the storage device accessible from the information processing apparatus 2000. The parameters of the recognizer 2020 stored in the storage device, are updated through the training performed by the training unit 2060. However, the parameters stored in the storage device are not necessarily required to be overwritten, and the past parameters may remain in the storage device.

Modified Example

The structure information 40 output from the recognizer 2020 may include various pieces of information relevant to the crowd in addition to the above-described location and the direction of the object included in the crowd. For example, the structure information 40 includes information (hereinafter, density information) describing a density of the object included in the crowd. The density information is, for example, a map describing a distribution of the density of the object. The map describing the distribution of the density of the object is data in which a numerical value describing the density of the object in one or more region is superimposed on the regions on the image 10.

In a case where the density information is output as the structure information 40, the training data 50 further includes density information relevant to the crowd included in the training image 52. Further, the training of the recognizer 2020 is performed based on an error between the density information output from the recognizer 2020 and the density information included in the training data 50.

In another example, the structure information 40 includes information (hereinafter, velocity information) describing a movement velocity of the object included in the crowd. The velocity information is, for example, a map describing a distribution of the movement velocity of the object. Here, the map describing the distribution of the movement velocity of the object is data in which a vector (a direction and a velocity) describing the movement velocity of each object included in the crowd is superimposed on the image 10. However, the map describing the distribution of the movement velocity of the object may indicate the movement velocity of the object for each region on the image 10, instead of the movement velocity for an individual object. In this case, a statistic value (for example, an average vector) of the velocity of the object included in each region is superimposed on the image 10.

In a case where the velocity information is output as the structure information 40, the training data 50 further includes velocity information for the object included in the training image 52. Further, the training of the recognizer 2020 is performed based on an error between the velocity information output from the recognizer 2020 and the velocity information included in the training data 50.

Similar to the network which outputs the location and the direction of the object, by adding a network that outputs the density information or the velocity information to the recognizer 2020 so as to share one or more nodes with the network that outputs the label 30, the network that outputs the label 30 are also trained through the training using the density information and the velocity information. Thus, it is possible to improve the recognition accuracy of the label 30 using the density information and the velocity information. In addition, in a case where the recognizer 2020 outputs these pieces of information even in the operation phase, it is also possible to acquire more detailed information for the crowd included in the image 10 in a case where the information processing apparatus 2000 is operated.

Further, the information processing apparatus 2000 are advantageous in that the recognition accuracy of the label 30 is able to be improved without any addition to the input of the recognizer 2020, by adding a recognizer that recognizes information acquired from an image into the recognizer 2020 and adding a correct solution for that information into the training data 50. For example, in a modified example, the recognition accuracy of the label 30 is improved without modifying the input of the recognizer 2020 by adding a network which recognizes the density information and the velocity information into the recognizer 2020 and adding the correct solutions of the density information and the velocity information into the training data 50.

In addition, the structure information 40 may include the locations of the object defined by each of the plurality of methods, as the location of the object. For example, in FIGS. 6 and 7, the methods for defining the location of the object are different from each other, and thus the location matrixes different from each other are output with respect to the same input image. Here, both the location matrix illustrated in FIG. 6 and the location matrix illustrated in FIG. 7 are included in the structure information 40 as the locations of the objects included in the input images illustrated in FIGS. 6 and 7.

In order to realize the recognizer 2020 which performs the above-mentioned output, the recognizer 2020 is formed to output the locations of the object corresponding to each of the plurality of methods. Further, the training structure information 56 describing the locations of the object defined by each of the plurality of methods is prepared as the location of the object included in the training image 52, and the training of the recognizer 2020 is performed.

In the same manner, the structure information 40 may include the directions of the object defined by each of the plurality of methods, as the direction of the object. To do so, the recognizer 2020 is formed to output the directions of the object corresponding to each of the plurality of methods. Further, the training structure information 56 describing the directions of the object defined by each of the plurality of methods is prepared as the direction of the object included in the training image 52, and the training of the recognizer 2020 is performed.

Here, in the case of the operation, it is not necessary to indicate the location and the direction of the object using the plurality of methods, and there is a case where it is sufficient to acquire the location and the direction of the object indicated by one method. Here, the recognizer 2020 may be formed to output the location and the direction of the object corresponding to each of the plurality of methods only in the case of the training, and to output only the location and the direction of the object corresponding to any one of the methods in the case of the operation. In this manner, it is possible to improve the recognition accuracy of the label of the crowd through the training of the recognizer 2020 using the location and the direction defined by the plurality of methods, and it is possible to reduce the time demanded for the recognition process in the case of the operation.

Hereinabove, although the example embodiments of the present invention are described with reference to the accompanying drawings, the example embodiments are examples of the present invention. It is possible to use a configuration, with which the configurations of the respective example embodiments are combined, or another various configurations.

Although part of an entirety of the example embodiments may be described as supplements below, the present invention is not limited thereto.

1. An information processing apparatus comprising:
    a recognizer that outputs a label describing a type of a crowd included in an image and structure information describing a structure of the crowd, in response to input of the image;
    an acquisition unit that acquires training data, the training data including: the image; and the label and the structure information that are to be output in response to inputting the image to the recognizer; and
    a training unit that inputs the image included in the training data to the recognizer, and that performs training of the recognizer using the label and the structure information output from the recognizer, and the label and the structure information included in the training data,
    wherein the structure information includes a location and a direction of an object included in the image.
2. The information processing apparatus according to 1,
    wherein the structure information of the training data indicates the location and the direction for only an object included in a crowd included in the image of the training data.
3. The information processing apparatus according to 1 or 2,
    wherein the structure information of the training data indicates: the location of the object in association with one or more of a plurality of partial regions, which are acquired by dividing the image of the training data; and the direction of the object included in each of the partial region.
4. The information processing apparatus according to any one of 1 to 3,
    wherein the object is a human, and
    wherein the structure information of the training data indicates: the location of each object included in the image of the training data as either one of a location of a head, a central location of a human body, a location of a head region, and a location of a human body region; and the direction of each object included in the image of the training data as either one of a direction of the head, a direction of the human body, a direction of the head region, and a direction of the human body region.
5. The information processing apparatus according to any one of 1 to 4,
    wherein the structure information of the training data includes either one or both of density information describing a distribution of density and velocity information describing a distribution of a velocity, for the object included in the image of the training data, and
    wherein the structure information output from the recognizer includes either one or both of the density information and the velocity information for the object of the input image.
6. The information processing apparatus according to any one of 1 to 5,
    wherein the recognizer outputs the structure information in a training phase and does not output the structure information in an operation phase.
7. The information processing apparatus according to any one of 1 to 6,
    wherein the recognizer is configured as a neural network,
    wherein the neural network includes a first network which recognizes the label, and a second network which recognizes the structure information, and
    wherein the first network and the second network share one or more nodes with each other.

8. The information processing apparatus according to any one of 1 to 7,
wherein the structure information of the training data includes locations of the object that are defined by each of a plurality of methods for defining the location of the object, as the location of each object included in the image of the training data, and
wherein the structure information output from the recognizer includes locations corresponding to each of the plurality of methods, as the location of each object included in the input image.

9. The information processing apparatus according to any one of 1 to 8,
wherein the structure information of the training data includes directions defined by each of a plurality of methods for defining the direction of the object, as the direction of each object included in the image of the training data, and
wherein the structure information output from the recognizer includes directions corresponding to each of the plurality of methods as the direction of each object included in the input image.

10. A control method performed by a computer which includes a recognizer outputting a label describing a type of a crowd included in an image and structure information describing a structure of the crowd in response to input of the image, the control method comprising:
acquiring training data, the training data including: the image; and the label and the structure information that are to be output in response to inputting the image to the recognizer; and
inputting the image included in the training data to the recognizer, and that performs training of the recognizer using the label and the structure information output from the recognizer, and the label and the structure information included in the training data,
wherein the structure information includes a location and a direction of an object included in the image.

11. The control method according to 10,
wherein the structure information of the training data indicates the location and the direction for only an object included in a crowd included in the image of the training data.

12. The control method according to 10 or 11,
wherein the structure information of the training data indicates: the location of the object in association with one or more of a plurality of partial regions, which are acquired by dividing the image of the training data; and the direction of the object included in each of the partial region.

13. The control method according to any one of 10 to 12,
wherein the object is a human, and
wherein the structure information of the training data indicates: the location of each object included in the image of the training data as either one of a location of a head, a central location of a human body, a location of a head region, and a location of a human body region; and the direction of each object included in the image of the training data as either one of a direction of the head, a direction of the human body, a direction of the head region, and a direction of the human body region.

14. The control method according to any one of 10 to 13,
wherein the structure information of the training data includes either one or both of density information describing a distribution of density and velocity information describing a distribution of a velocity, for the object included in the image of the training data, and
wherein the structure information output from the recognizer includes either one or both of the density information and the velocity information for the object of the input image.

15. The control method according to any one of 10 to 14,
wherein the recognizer outputs the structure information in a training phase and does not output the structure information in an operation phase.

16. The control method according to any one of 10 to 15,
wherein the recognizer is configured as a neural network,
wherein the neural network includes a first network which recognizes the label, and a second network which recognizes the structure information, and
wherein the first network and the second network share one or more nodes with each other.

17. The control method according to any one of 10 to 16,
wherein the structure information of the training data includes locations of the object that are defined by each of a plurality of methods for defining the location of the object, as the location of each object included in the image of the training data, and
wherein the structure information output from the recognizer includes locations corresponding to each of the plurality of methods, as the location of each object included in the input image.

18. The control method according to any one of 10 to 17,
wherein the structure information of the training data includes directions defined by each of a plurality of methods for defining the direction of the object, as the direction of each object included in the image of the training data, and
wherein the structure information output from the recognizer includes directions corresponding to each of the plurality of methods as the direction of each object included in the input image.

19. A program causing a computer to perform respective steps of the control method according to any one of 10 to 18.

What is claimed is:
1. An information processing apparatus comprising:
a processor; and
a memory coupled to the processor and storing instructions executable by the processor to:
acquire training data including an image, a label describing a type of crown included in the image, and structure information describing a structure of the crowd; and
train a model using the training data, wherein
the structure information includes a location of an object included in the image and a direction the object is facing in the image, and
when a new image is input into the trained model, the trained model outputs a label describing a type of crowd included in the new image and structure information describing a structure of the crowded included in the new image.

2. The information processing apparatus according to claim 1,
wherein the structure information of the training data indicates the location and the direction for only the object.

3. The information processing apparatus according to claim 1,
wherein the structure information of the training data indicates: the location of the object in association with one or more of a plurality of partial regions acquired by dividing the image of the training data, and the direction of the object included in each partial region.

4. The information processing apparatus according to claim 1,
wherein the object is a human, and
wherein the structure information of the training data indicates the location of the object included in the image of the training data as either a location of a head, a central location of a human body, a location of a head region, or a location of a human body region; and the direction of the object included in the image of the training data as a direction of the head, a direction of the human body, a direction of the head region, or a direction of the human body region.

5. The information processing apparatus according to claim 1,
wherein the structure information of the training data includes either one or both of density information describing a distribution of density and velocity information describing a distribution of a velocity, for the object included in the image of the training data, and
wherein the structure information output by the model includes either one or both of the density information and the velocity information for the new image.

6. The information processing apparatus according to claim 1,
wherein the model outputs the structure information in a training phase and does not output the structure information in an operation phase.

7. The information processing apparatus according to claim 1,
wherein the model is configured as a neural network,
wherein the neural network includes a first network which recognizes the label, and a second network which recognizes the structure information, and
wherein the first network and the second network share one or more nodes with each other.

8. The information processing apparatus according to claim 1,
wherein the structure information of the training data includes the location as defined by each of a plurality of methods for defining the location of the object, and
wherein the structure information by the model includes locations corresponding to each of the plurality of methods, for the new image.

9. The information processing apparatus according to claim 1,
wherein the structure information of the training data includes the direction as defined by each of a plurality of methods for defining the direction of the object, and
wherein the structure information output by the model includes directions corresponding to each of the plurality of methods, for the new image.

10. A control method performed by a computer and comprising:
acquiring training data including an image, a label describing a type of crowd included in the image, and structure information describing a structure of the crowd; and
training a model using the training data, wherein
the structure information includes a location of an object included in the image and a direction the object is facing in the image, and
when a new image is input into the trained model, the trained model outputs a label describing a type of crowd included in the new image and structure information describing a structure of the crowded included in the new image.

11. The control method according to claim 10,
wherein the object is a human, and
wherein the structure information of the training data indicates the location of the object included in the image of the training data as either a location of a head, a central location of a human body, a location of a head region, or a location of a human body region; and the direction of the object included in the image of the training data as a direction of the head, a direction of the human body, a direction of the head region, or a direction of the human body region.

12. The control method according to claim 10,
wherein the structure information of the training data includes either one or both of density information describing a distribution of density and velocity information describing a distribution of a velocity, for the object included in the image of the training data, and
wherein the structure information output by the model includes either one or both of the density information and the velocity information for the new image.

13. The control method according to claim 10,
wherein the model outputs the structure information in a training phase and does not output the structure information in an operation phase.

14. The control method according to claim 10,
wherein the structure information of the training data includes the location as defined by each of a plurality of methods for defining the location of the object, and
wherein the structure information by the model includes locations corresponding to each of the plurality of methods, for the new image.

15. The control method according to claim 10,
wherein the structure information of the training data includes the direction as defined by each of a plurality of methods for defining the direction of the object, and
wherein the structure information output by the model includes directions corresponding to each of the plurality of methods, for the new image.

16. A non-transitory storage medium storing a program to cause a computer to execute a control method comprising:
acquiring training data including an image, a label describing a type of crowd included in the image, and structure information describing a structure of the crowd; and
training a model using the training data, wherein
the structure information includes a location of an object included in the image and a direction the object is facing in the image, and
when a new image is input into the trained model, the trained model outputs a label describing a type of crowd included in the new image and structure information describing a structure of the crowded included in the new image.

17. The information processing apparatus according to claim 1,
wherein the type of the crowd described by the label is a queue structure, an enclosure structure, a panic structure, a discrete structure, a confluence structure, a gathering structure, a congestion structure, a stay structure, an avoidance structure, a reverse movement structure, or a traversal structure.

18. The control method according to claim 10,
wherein the type of the crowd described by the label is a queue structure, an enclosure structure, a panic structure, a discrete structure, a confluence structure, a gathering structure, a congestion structure, a stay structure, an avoidance, structure, a reverse movement structure, or a traversal structure.

19. The non-transitory storage medium according to claim 16,
wherein the type of the crowd described by the label is a queue structure, an enclosure structure, a panic structure, a discrete structure, a confluence structure, a gathering structure, a congestion structure, a stay structure, an avoidance structure, a reverse movement structure, or a traversal structure.

20. The non-transitory storage medium according to claim 16,
wherein the structure information of the training data includes either one or both of desnity information describing a distribution of density and velocity information describing a distribution of a velocity, for the object included in the image of the training data, and
wherein the structure information output by the model includes either one or both of the desnity information and the velocity information for the new image.

* * * * *